(No Model.)

J. B. WILLIAMS.
ZINC ELECTRODE FOR GALVANIC BATTERIES.

No. 408,279. Patented Aug. 6, 1889.

Witnesses:
R. H. Welty
B. C. Vas Emore

Inventor
James B. Williams

UNITED STATES PATENT OFFICE.

JAMES B. WILLIAMS, OF OAKLAND, CALIFORNIA.

ZINC ELECTRODE FOR GALVANIC BATTERIES.

SPECIFICATION forming part of Letters Patent No. 408,279, dated August 6, 1889.

Application filed December 12, 1885. Serial No. 185,534. (No model.)

*To all whom it may concern:*

Be it known that I, JAMES B. WILLIAMS, a citizen of the United States, residing at Oakland, in the county of Alameda and State of California, have invented a new and useful Improvement in Battery-Zincs, of which the following is a specification.

The object of my invention is to provide zincs for galvanic batteries which will be self-amalgamating during the action of the cells to which the zincs belong as long as the mercury with which the zincs are supplied is maintained, and the amalgamation thereof to be accomplished without removing the zincs from the cells.

The usual method of amalgamating battery-zincs is by immersing them in a suitable acid mixture to clean their surfaces, and then spreading mercury over the surfaces which have been cleaned by the action of the acid mixture. The film of mercury on the zincs gradually disappears during the action of the cells and must be renewed by reamalgamating or by keeping a quantity of mercury in contact with the zincs, usually in the bottom of the cells in which the zincs stand.

My invention, when applied to battery-zincs where the zincs are acted upon by acid solutions and where the shapes of the zincs and their containing-cells will admit of the application of the invention, removes the trouble of reamalgamating the zincs by the usual method or of keeping a comparatively large quantity of mercury in the bottom of the cells in which the zincs stand.

Figure 1:
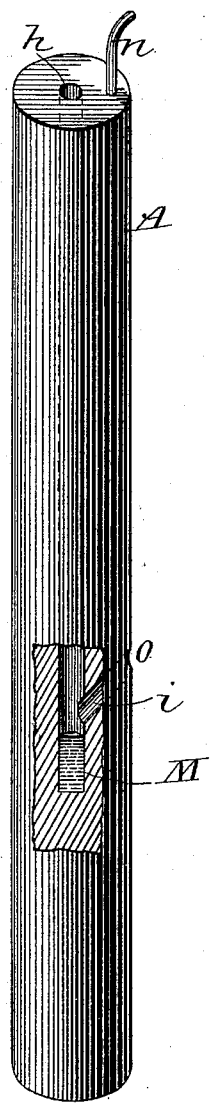
Figure 2:
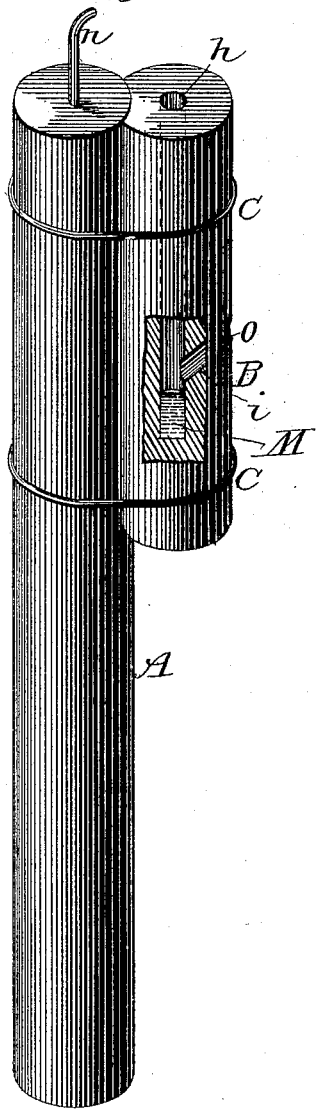

In the drawings, Figure 1 illustrates my invention as applied to battery-zincs having the shape of a cylindrical rod, a section being removed to show the position of a cavity containing mercury, (to be hereinafter specified;) and Fig. 2 illustrates my invention as applied to a body composed of zinc, which is securely fastened to the cylindrical zinc represented in Fig. 1, a section being removed to show the position of a cavity containing mercury, (to be hereinafter specified.)

The cavity containing mercury M is formed entirely in the substance of the zinc, or in a body B composed of zinc and having any suitable shape and size, which can be securely fastened to the zinc by wires or bands C C, which are protected from the action of the battery solution by covering them with suitable compositions. From near the bottom of the cavity a canal $i$ runs obliquely in an upward direction, and its opening $o$ is on a portion of the surface of the zinc which is below the level of the battery solution. Another canal $h$ runs in an upward direction and terminates on a portion of the surface of the zinc which is outside the battery solution. The purpose of the canal $i$ is to allow the battery solution to have access to the mercury in the bottom of the cavity, and that of the canal $h$ to allow mercury to be poured into the cavity without removing the zinc from its cell. The cavity and its outlets are formed in the zinc during the process of casting the zinc or by drilling after the zinc has been cast.

In the drawings I illustrate my invention as applied to battery-zincs having the shape of a cylindrical rod; but it may also be applied to zincs having other shapes. The cavity and its outlets can have any suitable shape and size, and the zinc body, if used, can also have any suitable shape and size, and may be fastened to any convenient portion of the battery-zinc to which it belongs. One portion of the surface of the zinc body should have such a shape given to it that it will closely fit that portion of the surface of the battery-zinc to which it is fastened to prevent as much as possible the passage of the battery solution between those portions of the zinc and its body which are joined together.

To prepare the zincs for use, they are first amalgamated in the usual manner, a quantity of mercury placed in the cavities, and the zincs placed in their cells. If the zinc bodies are used, they are first fastened to their zincs and amalgamated with them in the usual manner, and a quantity of mercury placed in their cavities, after which they are placed in their cells. The mercury is renewed from time to time, as the film of mercury on the zincs and bodies, if the bodies are used, is removed during the action of the battery. The zincs will continue to be self-amalgamating until the zinc is dissolved to such an extent that the cavity will no longer retain the mercury which is poured through the canal $h$.

The conducting-wires fastened to the zincs are represented by $n$ $n$.

I am aware that prior to my invention battery-zincs have been made which contain cavities hollowed out in some portion of the surface of the zinc—usually the upper portion—to contain mercury, the purpose of the mercury being to replace the film of mercury on the surface of the zinc as it is destroyed during the action of the battery. Such, therefore, I do not claim.

What I do claim, and desire to secure by Letters Patent, is—

1. A zinc for galvanic batteries, provided with a cavity to contain mercury entirely within the zinc and having a canal extending obliquely in an upward direction from near the bottom of the cavity to a point on the surface of the zinc which is below the level of the battery-fluid, and a canal extending in an upward direction from the upper portion of the cavity to a point on the upper surface of the zinc which is outside the battery-fluid, substantially as specified, and for the purpose set forth.

2. A body composed of zinc which can be securely fastened to a battery-zinc, said body being provided with a cavity to contain mercury entirely within the lower portion of the body and having a canal extending obliquely in an upward direction from near the bottom of the cavity to a point on the surface of the body a short distance above the bottom of the cavity, and a canal extending in an upward direction from the upper portion of the cavity to a point on the upper portion of the surface of the zinc, and when the body is joined to the zinc the opening of the lower canal to be below the level of the battery-fluid and the opening of the upper canal to be above the level of the battery-fluid, substantially as specified, and for the purpose set forth.

3. The combination of a battery-zinc and a body composed of zinc, said body being provided with a cavity to contain mercury entirely within the lower portion of the body and having a canal extending obliquely in an upward direction from near the bottom of the cavity to a point on the surface of the body a short distance above the bottom of the cavity, and a canal extending in an upward direction from the upper portion of the cavity to a point on the upper portion of the surface of the zinc, and when the body is joined to the zinc the opening of the lower canal to be below the level of the battery-fluid and the opening of the upper canal to be above the level of the battery-fluid, substantially as specified, and for the purpose set forth.

JAMES B. WILLIAMS.

Witnesses:
 CHAS. H. LEWIS,
 ROBERT MCELROY.